Sept. 8, 1970 W. C. O'NEILL 3,527,403
COUNTER-COMPARATOR SYSTEM
Original Filed Oct. 22, 1965 4 Sheets-Sheet 4
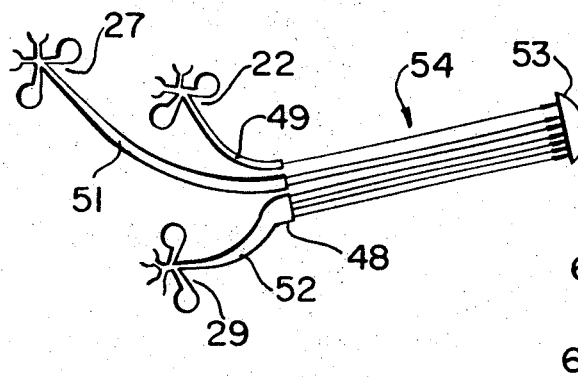
FIG.4
FIG.5
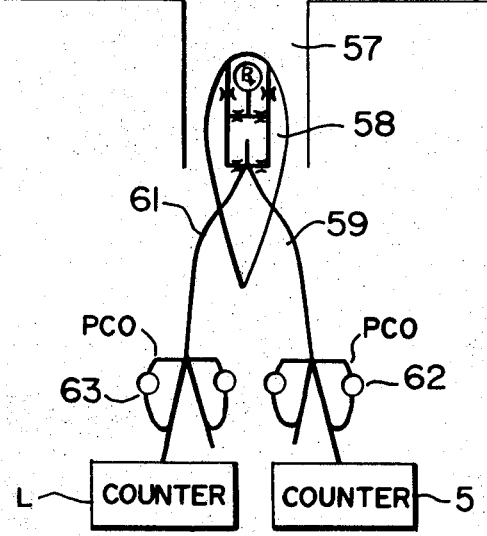
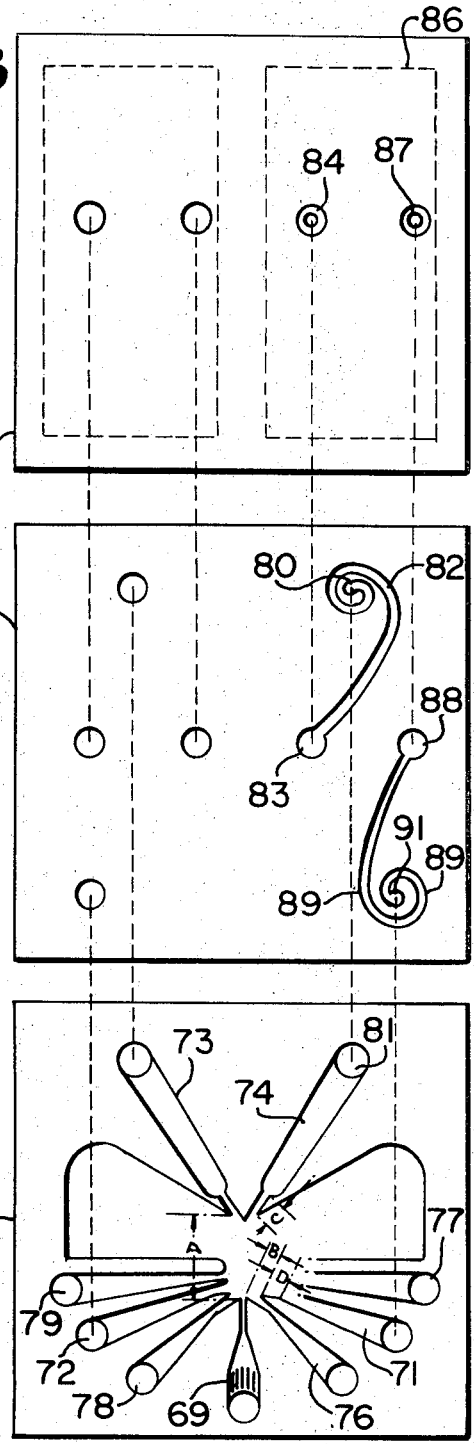
FIG.6
INVENTOR
WILLIAM C. O'NEILL.
BY Hurvitz + Rose
ATTORNEYS United States Patent Office 3,527,403
Patented Sept. 8, 1970

3,527,403
COUNTER-COMPARATOR SYSTEM
William C. O'Neill, Washington, D.C., assignor to Bowles Engineering Corporation, Silver Spring, Md., a corporation of Maryland
Original application Oct. 22, 1965, Ser. No. 500,672. Divided and this application May 24, 1968, Ser. No. 774,550
Int. Cl. G06d 1/10; G06g 5/00
U.S. Cl. 235—201
3 Claims

ABSTRACT OF THE DISCLOSURE

A capillary adder comprises a plurality of groups of capillary passages, each passage having the same resistance to fluid flow, distinct sources of fluid signal being connected to respective groups so as to produce equal flows in each passage. A summing volume is connected to receive flows from all of the passages. The number of passages in each group is determined by the weight assigned to the source of signal applied to that group.

---

This application is a division of my application Ser. No. 500,672, filed Oct. 22, 1965, and entitled "Counter-Comparator System."

The present invention relates to pure fluid counting mechanisms and more particularly to a pure fluid counting mechanism for producing an output signal indicative of the difference between the counts of two counting mechanisms which counts may be determined by either an analog or digital function to be sensed or regulated.

It is an object of the present invention to provide an apparatus for producing an output signal which is a function of a difference in count between the digital counters.

It is another object of the present invention to provide an apparatus for producing an output signal indicative of the difference in the count in two counters wherein weighted signal increment is added to the output signal for each stage of the counters only when the corresponding stages of the two counters register different counts.

It is still another object of the present invention to provide an apparatus for producing an output signal indicative of the difference in counts between two counters wherein signals indicative of the stages of the counters in which different counts appear are weighted by means of a capillary adder.

Yet another object of the present invention is to provide an apparatus for producing an output signal indicative of the difference in frequency of oscillation of two oscillators.

It is still another object of the present invention to provide an apparatus for producing an output signal which maintains the sign of the output signal so long as the difference in total counts in two digital counters does not exceed the design limits of the apparatus.

It is yet another object of the present invention to provide an apparatus for producing a pulse-width modulated output signal wherein the capacity of the counters employed may be increased without decreasing the pulse repetition rate of the output signal.

The above and still further objects, features and advantages of the present invention will become apparent upon consideration of the following detailed description of one specific embodiment thereof, especially when taken in conjunction with the accompanying drawing, wherein:

FIG. 4 is a flow diagram of a portion of a capillary adder employed in FIGS. 2 and 3;

FIG. 5 is a schematic diagram of a system of the present invention employed as a readout device for vortex amplifiers; and FIG. 6 is an exploded view of a pressure controlled oscillator employed in the apparatus of FIG. 5.

Figure 1:
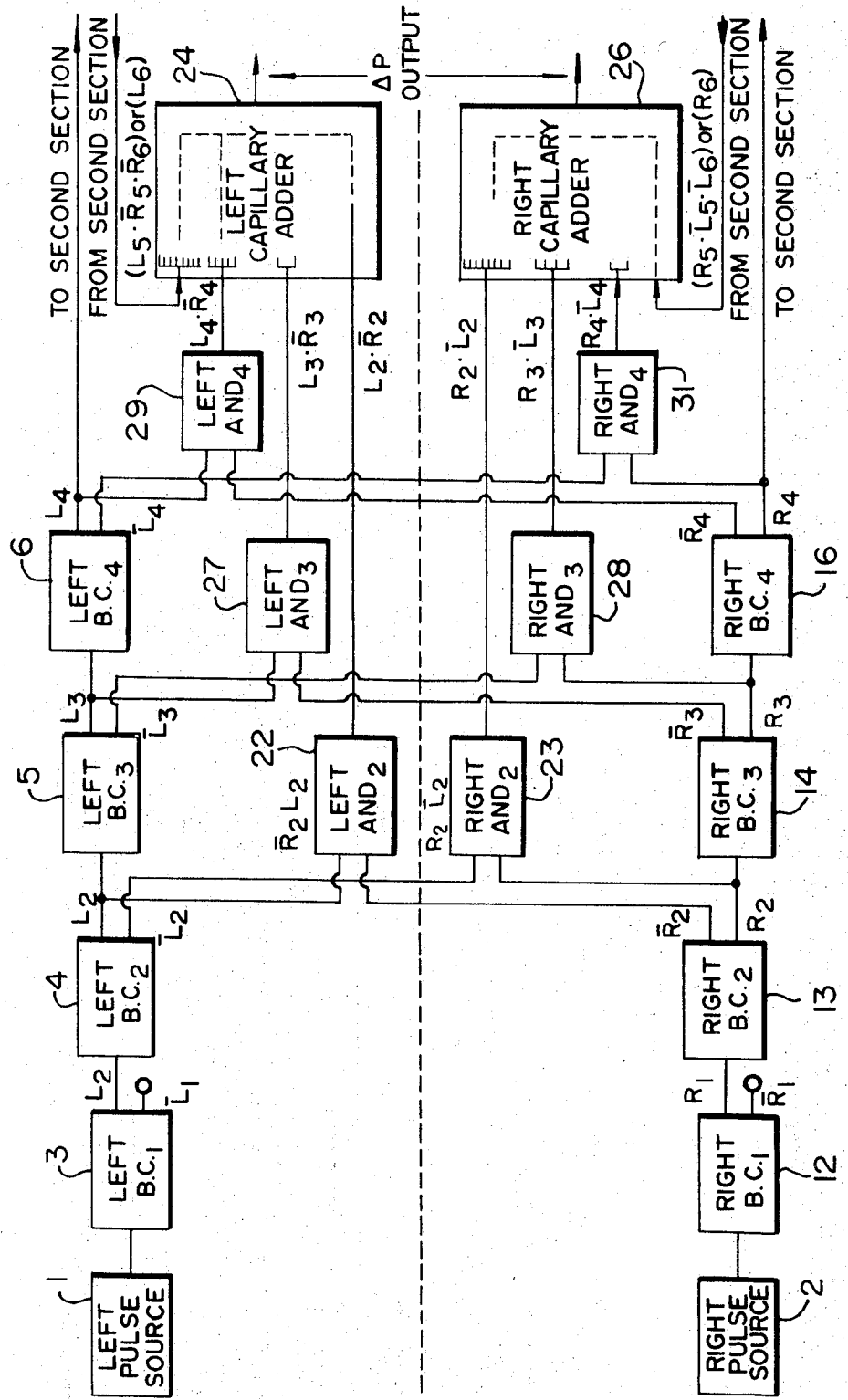
FIG. 1 illustrates in block diagram form one-half of the counter and conversion circuit of the present invention.
Figure 2:
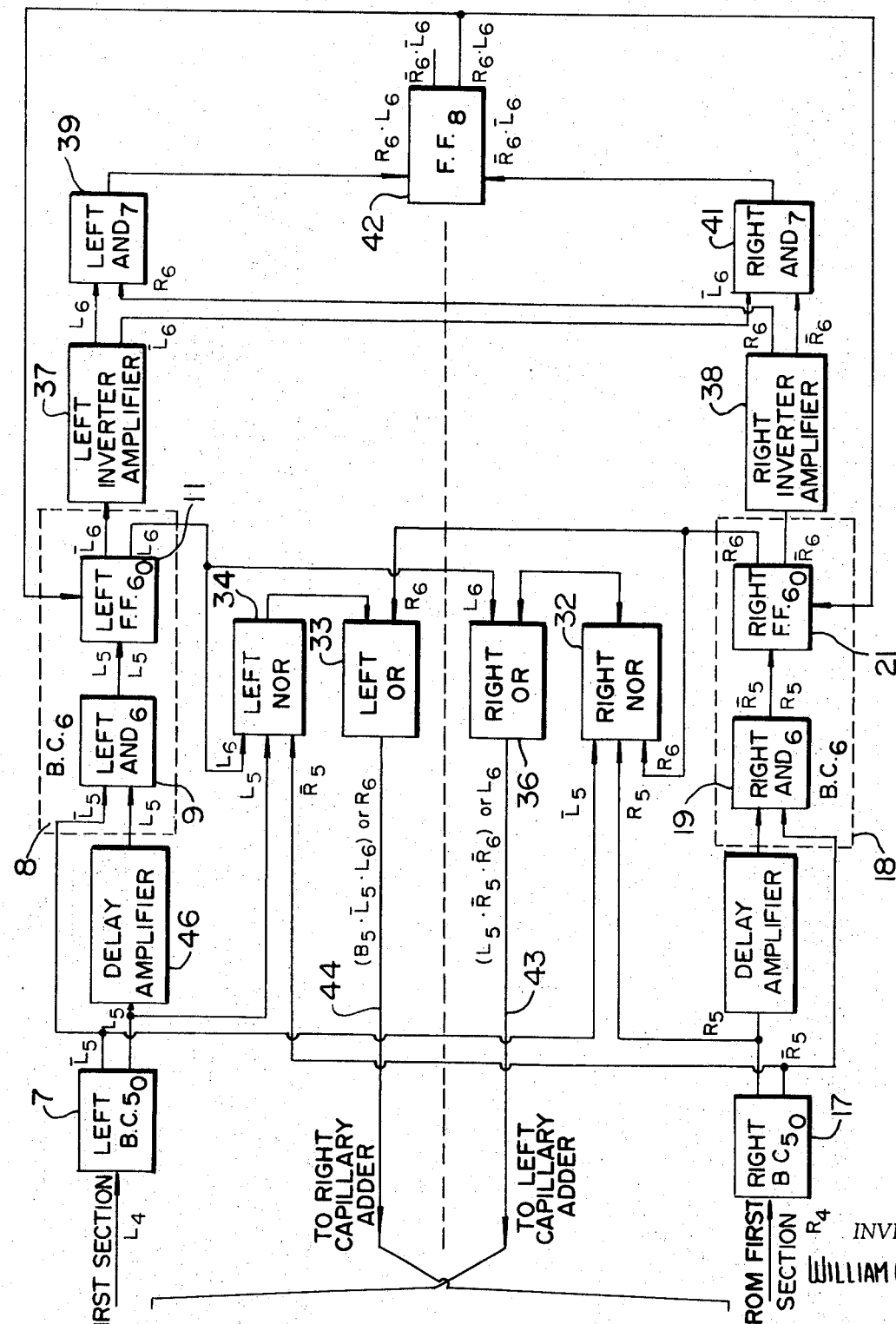
FIG. 2 represents a second-half of the counter and conversion circuit, the first half of which is illustrated in FIG. 1.

Referring specifically to FIGS. 1 and 2, there is illustrated the logic block diagram of the apparatus for providing an analog output signal which varies as a function of the difference in pulse rates of two pulse sources. Specifically the apparatus is provided with a left pulse source 1 and a right pulse source 2. These sources may take many forms and basically are devices which produce pulses at rates which are related to information to be acted upon by the apparatus. In one specific application of the invention, which is illustrated in FIG. 5 hereof, the sources are pressure controlled oscillators in which the frequency of oscillation, and therefore, the pulse source frequency, is a function of a difference in pressure between two pressure measuring orifices. The left and right sections of the apparatus are identical, the left (upper) section comprising a binary counter including a first binary stage 3, a second binary stage 4, a third binary stage 5, a fourth binary stage 6, a fifth binary stage 7 and a sixth binary stage 8, enclosed within the dashed line, and including a left AND gate 9 and a left flip-flop 11. The right (lower) binary counter includes corresponding elements designated by reference numerals 12–14 and 16–21, respectively. It will be noted that each of the binary stages has two output channels, the channels being designated as $L_1$ and $\bar{L}_1$, when referring to the first stage 3 of the left binary counter. The $L_1$ output channel is the channel which receives fluid when the binary stage is in the one position and the $\bar{L}_1$ is the channel which receives fluid when the binary counter is in the zero state. The $L_2$ output passage of the binary counter 4 and the $\bar{R}_2$ output passage of the binary counter 13, these being the left and right stages, respectively, of the left and right binary chains, are connected as two input channels to a left AND gate 22. The $\bar{L}_2$ output passage and $R_2$ output passage are connected to a right AND gate 23.

If the second left binary stage 4 is in the one, i.e., the binary 1 condition, and the right binary stage 13 is also in the one condition, neither of the AND gates 22 and 23 produce an output signal. Also if both gates are concurrently in the zero position neither of the gates 22 and 23 produces an output flow. However, if one stage, for instance stage 4, is in the one condition and stage 13 is in the zero condition, the left AND gate 22 produces a fluid output flow to a left capillary adder 24. On the other hand, if the stage 4 is in the zero condition and the stage 13 is in the one condition the right AND gate 23 produces a flow to a right capillary adder 26.

Left AND gate 27 and right AND gate 28, associated with the left and right gates 5 and 14, respectively, sense corresponding conditions in the fourth stage binary counters 6 and 16 respectively. Thus, a pattern of fluid flows are provided to the left and right capillary adders 24 and 26, respectively, representing the correspondence or lack of correspondence between the individual counter stages in the left and right counter chains.

Since each stage of the left counter and also of the right counter represents different numbers having different weights in the total count; the first stage representing the least significant digit, one, and the sixth stage representing the most significant digit, 32; the output flows must be weighted to provide a total output flow representative of the true difference in counts. This weighting feature is described in detail in the discussion of FIG. 4 and it suffices to say at this point that the effect of the flow from each stage is doubled as the order of the stage increases. Thus stages two through five contribute flows increasing from 1/8 to 1. The first stage is not read in the apparatus of FIGS. 1 and 2 since its contribution is considered insignificant to the over-all signal. If it were desired to include the first stage then its contribution would be 1/16 of that of the fifth stage.

It should be noted that the comparison between stages is made on a stage-by-stage basis. This is an important feature since no signals are produced when the counters are in step, i.e., phase. Under these conditions there is no fluid flow from the capillary adders 24 and 26, as will be apparent subsequently by reference to FIG. 3. The output passages from the adders 24 and 26 are provided to opposed control nozzles of a proportional amplifier and thus in the situation where there is no flow from either capillary adder the output flow in the proportional amplifier divides equally between its two output channels and represents a zero error signal.

In fluid systems it is difficult to provide precise flow balance over an extended range of flow conditions such as being considered herein. Thus, if it were attempted to combine fluid flows from all of the binary stages directly into a single adder and develop two analog signals representing the difference in the total count, it would be very difficult to establish a repeatable null condition as well as repeatable intermediate conditions. However, in accordance with the present invention, since there is no flow from any stage to the adders in which the conditions are balanced, all that is required of the system is a single analog amplifier capable of providing equal flows when no signals are provided. Thus, a difference in flows is developed proportional only to the flows representing actual differences in stages rather than differences in total count. It is quite obvious that it is far simpler to balance a single unit so as to provide equal flows under a no signal condition than it is to attempt to provide precise balancing through the large number of units in the system under discussion. Further, even if precise division of flows in the analog amplifier cannot be easily achieved, it is a relatively simple matter to calibrate the apparatus to the non-uniform flows which are always of the same nature as opposed to attempting to calibrate the apparatus for the large number of permutations of flows which would be present under operating conditions.

The $L_4$ and $R_4$ output passages from the stages 6 and 16, respectively, are fed to the left and right fifth stage binary counters 7 and 17, respectively. It should be immediately noted that in FIG. 1 the upper lines between the stages 3, 4, 5 and 6 are the L outputs whereas the lower lines are the $\bar{L}$ outputs and relative to the right hand string the lowered line is the R output and the upper line is the $\bar{R}$ output. This convention is reversed in FIG. 2 in order to provide a simpler arrangement of elements in FIG. 2.

It will be noted in FIG. 2 that the arrangement of sensing elements for the fifth and sixth stages of the binary counters 7 and 8 in the left counter and counters 17 and 18 in the right counter is different from the preceding three stages. The reason for this is as follows: A six stage binary counter is capable of detecting up to 63 counts. However, in an apparatus such as that of the present invention, if there is a difference between the two counter chains, a reversal of the error signal is obtained if one stage counts out before the other. For instance, assume that the left counter is at a count of 63 and the right counter is at a count of 53. At this stage of operation, the left stage exceeds the right stage by a count of 10 indicating an error of a particular sign which appears as a differential in pressure of a specific magnitude between the output flows of the adders 24 and 26. If now one additional count is added to both counters the left stage counter goes to zero and the right stage counter is now at 54. Under these circumstances the sign of the output signal reverses indicating that a larger flow is obtained being from the right adder 26 than from the left adder 24 and the difference is 54.

In order to overcome this problem in accordance with the present invention, when both counters have achieved a count of 32 or greater, or stated otherwise when the lagging counter has achieved a count of 32, a count of 32 is subtracted from both counter chains. For instance, suppose the left counter has achieved a count of 32 and the right counter has achieved a count of 30. Under these circumstances no subtraction occurs. However, if two counts are now added to both counters, the left counter stands at a count of 34 and the right counter stands at a count of 32, indicating a higher count of two in the left counter. When the count of 32 is achieved in the right counter, both of the flip-flops 11 and 21 are now on indicating a count of 32. Immediately thereafter, as will be indicated subsequently, the flip-flops 11 and 21 are turned off, subtracting a count of 32 from both sides. The left chain now registers a count of 2 and the right chain registers a count of zero. The difference between the two counts remains the same and the sign of the difference in counts also remains the same.

The weight of the signal flow added to the capillary adders by both six stage counters, 8 and 18, is the same. This is not necessary to operation of the apparatus for general purposes, but in the particular situation for which the apparatus was designed, an error of 16 produces a maximum correction signal for the system, i.e., the control system is saturated. The counters of FIG. 1 produce a maximum count of 15. The counter stages of FIG. 2 are employed to perform a specific logic function in addition to providing the 16th count. The logic performed by the apparatus of FIG. 2 is as follows: Flow is applied to capillary adder 24 when the 5th and 6th stages of the counters assume the states $L_6$ or $(L_5 \cdot \bar{R}_5 \cdot \bar{R}_6)$, and to adder 26 when the 5th and 6th stages are in the states $R_6$ or $(R_5 \cdot \bar{L}_5 \cdot \bar{L}_6)$ in the other counter.

With this background, the portion of the apparatus illustrated in FIG. 2 is described. The $\bar{L}_5$ output passage of the stage 7 is applied to one input of left AND gate 9 forming a part of the binary stage 8 and also to a right NOR gate 32. The right NOR gate 32 is also supplied from the $R_5$ output passage of stage 17 and an $R_6$ output passage from the flip-flop 21 of the stage 18. It will be noted, thus, that the fifth and sixth right counter stages, 17 and 18, respectively, are connected in parallel to a common element so that these two signals are given the same weight. The $R_6$ output passage of the flip-flop 21 is also applied to a left OR gate 33 which receives a second input flow from a left NOR gate 34. The left NOR gate receives input signals from the $\bar{R}_5$, $L_5$ and $L_6$ passages, and therefore, corresponds in function to the right NOR gate 32. A right OR gate 36 receives an input signal from the right NOR gate 32 and from the $L_6$ output passage of the flip-flop 11, which output, as indicated above, is also supplied to the left NOR gate 34. The $\bar{L}_6$ and $\bar{R}_6$ output passages of the flip-flops 11 and 21, respectively, are applied to inverter amplifiers 37 and 38, respectively. The $L_6$ output flow from amplifier 37 is applied to a left AND gate 39 and the $\bar{R}_6$ output is applied to the right AND gate 41. The AND gate 41 also receives flow from the $\bar{L}_6$ passage of amplifier 37 and the AND gate 39 receives the $R_6$ flow from amplifier 38.

The output passages of the left and right AND gates 39 and 41 are applied to opposed control passages of a flip-flop 42 having one output passage $R_6L_6$ connected to an input of each of the flip-flops 11 and 21, respectively.

In operation, the NOR gates are devices which provide fluid signals to the indicated output passages when no fluid flow is provided to any of its three inputs. The OR gates, on the other hand, are devices which provide signals from on their output passages when either of their input passages have fluid flow provided thereto. Assume that the fifth stage counters 7 and 17 are both in the zero state, then right and left NOR gates 32 and 34 produce no output flows. However, if the left stage 7 is in the one state, it produces a flow to the left NOR gate but not to the right NOR gate 32. If the right stage 17 is in the zero condition indicating a difference in accounts between the two stages, no flow is provided to the right NOR gate and assuming that the right flip-flop 21 is in the zero state the right NOR gate 32 receives no input signals and develops a fluid flow in its output passage to the right OR gate 36. The right OR gate 36 is connected via a passage 43 to the left capillary adder 24 and contributes its signal to the total signal output appearing on the output passage of the capillary adder 24. The converse condition holds when the left flip-flop 7 is not and the right flip-flop 17 is on, then the left OR gate 33 provides a signal to the right capillary adder 26 via a passage 44.

The left and right counter stages 7 and 17 switch to the one condition upon receipt of the 16th count and are switched back to the zero condition upon receipt of the 32nd count. When the, for instance, left counter switches to the 32nd count, a signal is applied to the $\overline{L}_5$ output passage which is applied to the left AND gate 9 of the binary stage 8 of the left counter. A delayed amplifier 46 is connected between the $L_5$ output passage of the stage 7 and one of the input passages to the gate 9. The delay amplifier 46 maintains a flow in its $L_5$ output passage for a short interval after application of the $\overline{L}_5$ signal to the left AND gate 9 so as to provide a differential, short duration pulse to turn on flip-flop 11 upon receipt of the 32nd pulse. The short pulse is required so as not to interfere with reset pulses from flip-flop 42. The left NOR gate 34 is now blocked and a signal is applied through the right OR gate 36 to the right capillary adder 24 indicating that the left stage is advanced relative to the right stage. Again, it will be noted that the signal provided from the sixth stage of the counters follows the same path to the capillary adders as the signal from the fifth stages and thus no additional weight is given to this signal. The left inverter amplifier 37 inverts the $\overline{L}_6$ signal to provide an $L_6$ signal to the left AND gate 39. The right inverter amplifier provides an $R_6$ signal to the AND gate 39. Thus, although fluid is now being applied to the left AND gate 39 from the inverter amplifier 37 no fluid is applied from the amplifier 38 and the state of the flip-flop 42 remains unaltered.

At some subsequent time the binary stage 17 receives the 32nd count and the right flip-flop 21 is sent to the one state so that an $R_6$ signal is now applied to the left AND gate 39. The left AND gate now produces a fluid flow on its output passage to the flip-flop 42 and switches it to the $R_6$, $L_6$ state. Fluid flows from the flip-flop 42 to the left and right flip-flops 11 and 21, respectively, resetting them to the zero condition, thereby subtracting a count of 32 from both counters.

When the flip-flops 11 and 21 are reset and $\overline{R}_6$ and $\overline{L}_6$ signals are applied to the right AND gate 41, the flip-flop 42 is switched so the fluid is now applied to the $\overline{R}_6$, $\overline{L}_6$ output passage and dumped.

Figure 3:
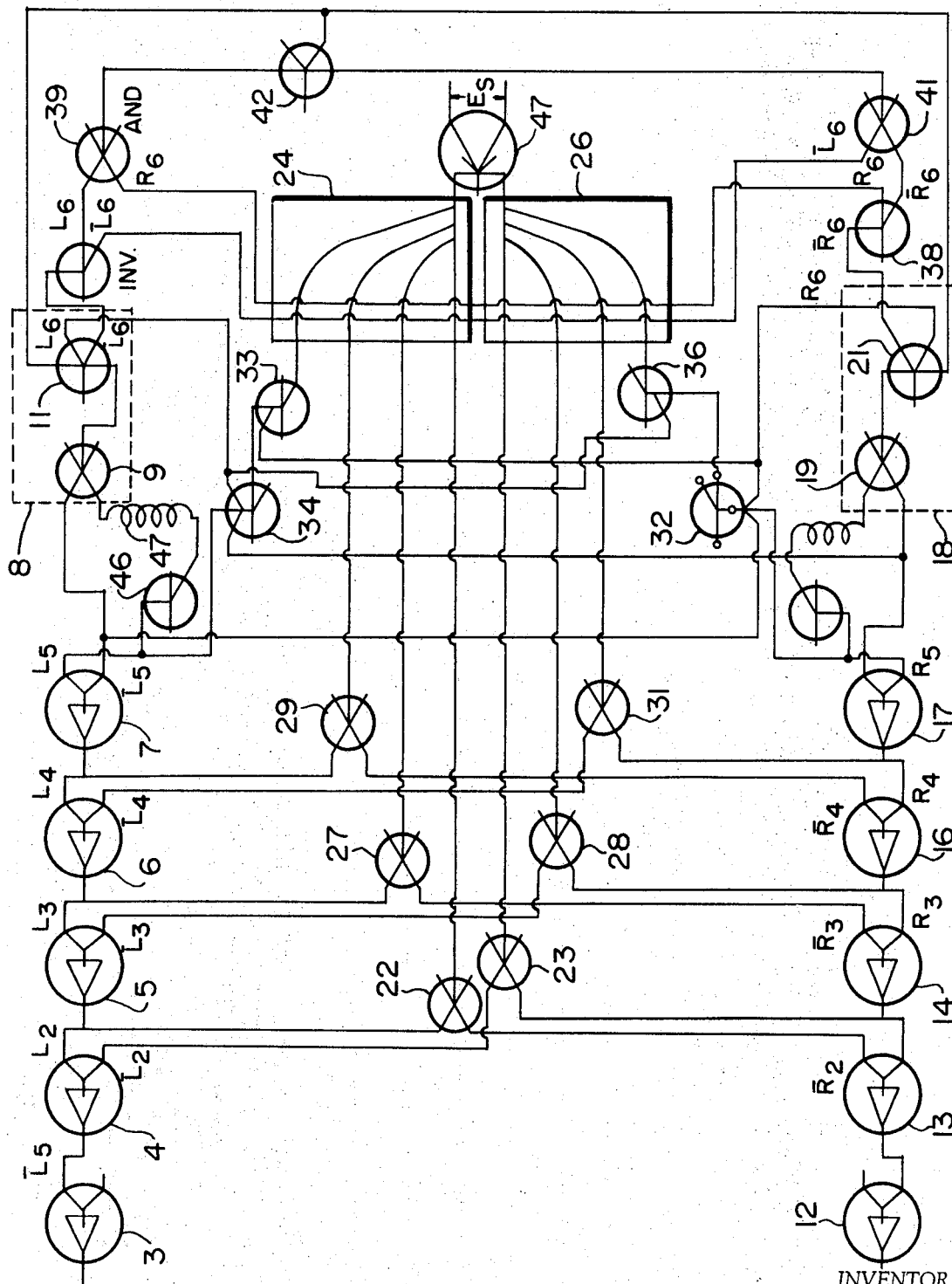
FIG. 3 is a schematic flow diagram of the apparatus of FIGS. 1 and 2.

FIG. 3 is a circuit diagram of a physical realization of the apparatus of FIGS. 1 and 2 in a fluid system. The binary stages 3, 4, 5, 6, 7, 12, 13, 14, 16 and 17 may be of the type illustrated in Warren Pat. No. 3,001,698 or Colston Pat. No. 3,244,370. The latter device would be used in all cases where a reset-to-zero capability is desired. The AND gates 9, 19, 22, 23, 27, 28, 29, 31, 39 and 41 may be passive AND gates as illustrated in Pat. No. 3,190,554. The OR and NOR gates are identical devices wherein, in the NOR gate one output channel is employed, whereas in the OR gate the other output channel is employed. This device may be of the type illustrated in copending patent application Ser. No. 240,061 by Dexter and Jones, filed Nov. 26, 1962. The delay amplifiers, such as amplifier 46, are OR gates followed by a delay element 47, which in the physical embodiment of the device is simply a passage of sufficient length to provide the necessary delay. The inverter amplifiers are also OR gates and thus it is seen that the apparatus of the invention employs three basic elements, binary stages such as 3, 12, etc., passive adders such as 22 and 23, and OR/NOR gates which serve as OR, and NOR gates and inverter and delay amplifier functions. In addition, the apparatus employs two flip-flops and an analog amplifier which appears in FIG. 3 and is designated by the reference numeral 47.

In addition to the above elements, two capillary adders are provided; one of these being illustrated in detail in FIG. 4 of the accompanying drawings. FIG. 4 illustrates the passive adders 22, 27 and 29 associated with the second, third and fourth stages of the left counter chain including the counter stages 4, 5 and 6. As indicated above, in order to provide proper weighting for each of the signals from each stage of the counters, certain ratios of signals must be maintained. Thus, the binary 2 signal must be one half of the binary 4 signal and the binary 2 signal must be one quarter of the binary 8 signal. The counter stages 4, 5 and 6 develop the binary 2, 4, and 8 signals respectively. Thus, the signal from the AND gate 22 must be one fourth that provided by the AND gate 29 and must be one half of that provided by the AND gate 27. In order to accomplish this the center output passages of each of the passive AND gates extend to a common point or line 48 via relatively large passages such as 49, 51 and 52, respectively. The AND gates are then connected from the point 48 to a summing region 53 via capillary or narrow passages generally designated by the reference numeral 54. The length of each of these passages, as can be seen in FIG. 4, is the same and their depths and widths are the same. Thus, each passage presents the same flow resistance from the point 48 to the region 53. However, the AND gate 22 is connected to the region 53 through only a single capillary passage whereas the AND gate 27 is connected by two capillary passages and the AND gate 29 by means of four capillary passages to the region 53. Thus the resistance to flow from each of the AND gates to the region 53 is a function of the number of capillary passages. It will be noted that each of the passages 49–51 and 52 are sufficiently large, that a relatively small signal drop occurs in these passages relative to the signal reductions introduced by the capillary passages 54. Thus the difference in lengths of the passages 49, 51 and 52 may be disregarded for all practical purposes, particularly since the apparatus is a null balancing system in which any of these differences disappear when a zero error signal is produced.

It is apparent that the OR gate 33 is connected to the region 53 in the same manner as the AND gates 22, 27 and 29 except that eight capillary passages are employed for the connection in order to provide a resistance to flow which is only half of that provided by the connection of the AND gate 29 to the region 53. The region 53, in effect, sums all of the digital signals provided or applied thereto so that an analog or at least a somewhat smoothed signal is applied to the amplifier 47.

The connection of the various AND gates associated with the right binary counter to the input to the analog amplifier 47 is identical with that illustrated in FIG. 4 so that the two halves of the system are completely symmetrical.

It has been stated previously that the apparatus of FIGS. 1, 2 and 3 is designed to, in effect, saturate when the difference in counts between the two binary counters exceeds 32, since in the particular system for which the apparatus is designed, any difference in counts of greater than 32 was considered to be meaningless. This, of course, refers only to a particular system and the difference in counts which the apparatus may indicate may easily be extended or reduced, for that matter, by simply adding additional or subtracting counter stages with associated AND gates and capillary adders between what is designated in these figures as the stages 6 and 7 in the left string and 16 and 17 in the right counter chain.

The system is designed such that the amplifier 47 does not saturate until the difference in the counts has equaled 32, or some other count for which the particular system is designed. In certain systems, it may be desired to maintain the maximum saturation signal regardless of the size of the difference in the count once it exceeds the maximum count for which the system is devised. The normal pure fluid analog amplifier does not operate in this manner, since once the signal has achieved the maximum for which the amplifier is designed, any increase in signal produces a decrease in the output signal of the amplifier. The mechanism involved in such operation is described in co-pending patent application of Roland Jones, Ser. No. 404,004, assigned to the same assignee as the present invention, now abandoned. In the event that it is desired to maintain a maximum saturation signal, even though the input signal may exceed the saturation signal for which the amplifier is designed, the amplifier disclosed in the aforesaid Jones application may be employed as the amplifier 47 of FIG. 3.

As previously indicated the apparatus of the present invention may be employed to compare any difference in the frequency of two pulse trains. The apparatus has been particularly described in a control function, but it is apparent that all of the description that has preceded is equally applicable to any pulse train comparison system.

Referring specifically to FIG. 5 of the accompanying drawings, there is illustrated a particular sensing apparatus adapted to employ the apparatus of FIGS. 1–3. The device of FIG. 5 is a mechanism for sensing the rate of rotation of fluid in a vortex amplifier, generally designated by the reference numeral 56, in order to provide a signal indicative of the rate of rotation of the fluid in the vortex chamber. As is well known, if a vortex chamber such as the chamber 56 is secured to an apparatus the rate of rotation of which is to be detected, a rate of rotation of fluid appears in an egress orifice 57 which is a direct function of the rate of rotation of the body.

A device generally designated by the reference numeral 58 is positioned in the egress orifice 57 to develop signals in output channels 59 and 61 which vary as a function of the rate of rotation in the fluid 57. The apparatus of FIG. 8 may take many forms and in one embodiment may be of the type described in Bowles et al., Pat. No. 3,327,529 for Lift Sensing and Measuring System. As described in such application the apparatus 58 is an angle of attack sensor wherein the pitch of the fluid rotating in the egress orifice 57 relative to the sensor changes with rate of rotation of the body to which the vortex system 56 is attached. The pressure of the flow signals appearing in the passages 59 and 61 vary as the change in this function. The passages 59 and 61 are connected respectively to two matched pressure-controlled oscillators 62 and 63. The oscillators 62 and 63 are such that when the signals 59 and 61 are equal, the rates of oscillation of the oscillators 62 and 63 are equal. An increase in the pressure applied to these oscillators increases their frequency of oscillation and a decrease in the signal decreases their frequency of oscillation in a prescribed manner which may be linear. Thus, when the flow signal developed in passages 59 and 61 are equal, indicating no rotation of the fluid in the egress orifice 57 and thus indicating no rotation of the body, the frequencies of the oscillators 62 and 63 are equal. However, upon the generation of rotation of the fluid in the egress passage 57, one of the oscillators 62, 63 increases in frequency and the other decreases in frequency, providing a difference in the pulse trains applied to the counter stages which are indicated as L and R in FIG. 5, corresponding to the left and right counters of FIGS. 1–3.

It will be noted that the direction of rotation of the fluid in the egress passage 57 determines which of the oscillators increases in frequency and which decreases and thus, one not only obtains the difference in the count, but the sense of the difference. Thus, when the apparatus of FIGS. 1–3 is employed in the system of FIG. 5 the output signal ES appearing across the output passages of the proportional amplifier 47 in FIG. 3 is an analog signal indicating the rate of rotation of the apparatus to which the vortex amplifier 56 is connected. Of course, it is not intended to limit the use of the apparatus of the invention to the specific environment of FIG. 5 since numerous sources of variable pulse trains are available. The system employing pressure controlled oscillators, as in FIG 5, may be employed with any transducer which produces a differentially varying output signal across two output channels as a function of any variable to be sensed.

A pressure controlled oscillator, which may be employed in FIG. 5, is illustrated in FIG. 6. Referring specifically to FIG. 6 of the accompanying drawings, the pressure controlled oscillator comprises a pure fluid analog amplifier 66, a transfer apparatus 67 and a tank structure 68 which provides capacitance for the system. The oscillator is basically a negative feedback apparatus having capacitance in the feedback network.

The amplifier includes a power nozzle 69 to which is applied a variable pressure to produce an oscillator frequency which varies as a linear function of the pressure. Therefore, and reference is made to FIG. 5, the nozzle 69 is connected to one or the other of the output leads 59 or 61, depending upon whether the apparatus is employed as the oscillator 62 or 63. The apparatus further includes control nozzles 71 and 72 and output passages 73 and 74. The amplifier includes two further control nozzles 76 and 77 on the right side of the apparatus and 78 and 79 on the left side thereof. The nozzles 76, 77, 78 and 79 are vented to the atmosphere and are employed to relieve static pressure on opposite sides of the power stream. The output passage 74 terminates in a region 81, adapted to be in fluid communication with a passage 80 formed in the plate of the transfer device 67. The transfer device 67 has an upper surface, which is viewed in FIG. 6 and which is channeled to provide necessary interconnections between various elements, and a second surface which is not visible, which is not channeled. The unchanneled surface is positioned over the channeled surface of the amplifier 66 to provide a seal for all of the channels except where communication between the channels formed in the one surface of the transfer device 67 are to be placed in communication with specified channels in the plate of the amplifier 66. A spiral channel 82 commences at aperture 80 through which it receives fluid from region 81 of passage 74 and terminates in an enlarged region 83 in communication with a transverse aperture 84 in the capacitor apparatus 68. The aperture 84 extends into communication with an enlarged open region 86 forming the capacitive element of the system. A second transverse aperture 87, which also is communication with the hollow or open region 86 of the capacitive element is in communication with an enlarged region 88 of a second helical path 89. The path 89 terminates in an aperture 91 in the plate of the apparatus 67 which aperture extends into communication with the control nozzle 71.

To assemble the device the plate 67 is lifted and placed in the position illustrated directly on top of the amplifier 66. The capacitive arrangement is rotated 180° about a horizontal axis through the center of the device in the plane of FIG. 6 and then placed on top of the transfer device 67. This procedure places the output passage 74 in communication with the aperture 80 of the plate 67 and the aperture 84 of the capacitive device 68 in communication with the enlarged area 83 of the plate 67. Also the aperture 87 is placed in communication with the enlarged region 88 in the plate 67 and the aperture 91 in the plate 67 is placed in communication with the control nozzle 71.

It should be noted that the devices 66, 67, 68 are completely symmetrical as between their right and left halves and therefore when the above arrangement is completed the left side of the amplifier 66 is interconnected with the member 67 and 68 in the same manner as described relative to the right side thereof.

Certain parameters of the fluid amplifier, the transfer device and the capacitor, are critical in the particular design of pressure controlled oscillator being described. More specifically, in one specific design of oscillator, the distance between the power nozzle and the collectors of the passages 73 and 74 is 0.18". The distance B on the drawing from the control nozzle to the power stream is 0.11". The length of the collector region of the passages 73 and 74, the dimension C on the drawings, is 0.07" long and the length of the control nozzle, the dimension D, is 0.06" long. Further, the length of the spiral passages 82 and 89 are the same and are 2.7" long and the volume of each of the tanks, such as the tank 86, comprising a capacitor, is 1.8 cubic inches in volume. Additional elements of the pressure controlled oscillator are critical. These parameters are as follows: The width and depth of the collector channel are 0.018" x 0.035", the cross-sectional dimensions of the control nozzle are 0.018" x 0.035" deep, the cross-section dimensions of the passages 82 and 89 are 0.1" wide x 0.04" deep, and the power nozzle is 0.012" wide by 0.035" deep.

It has been found that an oscillator constructed in accordance with the illustration of FIG. 6 and the dimensions indicated above may be employed for the oscillators 62 and 63 of FIG. 5 and provide an apparatus in which when the pressures developed in the passages 59 and 61 are equal, the frequency of oscillation of the two oscillators is equal. An increase in the pressure of one passage 62, 63 with a corresponding decrease in pressure in the other passage produces an increase in frequency of one oscillator and a decrease in frequency of the other oscillator in which the increase and decrease respectively are linear functions of the control pressure.

Thus, these oscillators are completely suitable for use as clock pulse sources to the left and right counters employed in FIGS. 1 and 2 of the accompanying drawings when analog pressures, regardless of source, are to be measured.

As previously indicated, it is one object of the present invention to provide a pulse-width-modulated output signal in which the width of the pulse is a function of the difference in count between two counters and wherein the output signal repetition rate is greater than would normally be achieved with counters having the capacity of the counters employed. More particularly, in a pulse-width-modulator of the type under consideration, the storage capacity of the counter, i.e., the difference in counts it may accept, is increased by adding counter stages to each counter but concurrently as each stage is added the output pulse rate is correspondingly reduced. An addition of one stage to each binary counter chain increases the capacity by two but also reduces the pulse repetition rate by two.

In accordance with the present invention the capacity of a counter may be increased without decreasing its output pulse repetition rate. Referring again to FIGS. 1 and 2, the pulse-width-modulator is the same as the circuit of FIGS. 1 and 2 except that the left and right AND gates and the capillary adders of FIG. 1 are eliminated. The output signals of the system are then taken directly across passages 43 and 44.

Assume now that right counter stage 17 is turned on while left counter stage 7 is not. A fluid signal now appears in passage 44 and remains until stage 7 is turned on at which time the signal is terminated. The length of time the signal is on is a fraction of the difference in count rates and therefore the width of the pulse is modulated by this latter factor. The effect of the sixth stage on the output flow is the same as the fifth stage. Specifically, suppose the 32nd count is received in the right counter before the corresponding pulse is received in the left counter. The right stage 18 again produces a signal in passage 44 regardless of the condition of the left counter stage 7. Thus, the output signal in passage 44 is maintained until the right counter switches from the fifth to sixth stages. The apparatus provides a pulse repetition rate of a counter having only five stages but performs as a counter having six stages. This philosophy may be extended to earlier stages in the counters so as to provide higher repetition rates without decreasing storage capacity.

In the above examples when the left counter stage 8 is turned on, to the one condition, the stages 8 and 18 are reset as previously indicated so as to subtract 32 from the counters and maintain the sign of the signal.

While I have described and illustrated one specific embodiment of my invention, it will be clear that variation of the details of construction which are specifically illustrated and described may be resorted to without departing from the true spirit and scope of the invention as defined in the appended claims.

I claim:
1. A capillary adder for summing a plurality of differently weighted fluid binary signals comprising:
   a plurality of groups of capillary passages, the number of groups being equal to the number of said binary signals, each capillary passage presenting substantially the same resistance to fluid flow;
   means for connecting each of said signals to one end of a respective group of passages such that each passage receives equal flow; and
   a summing volume connected to the other end of all of said passages;
   and the number of passages in each of said groups is proportional to the respective weights of said signals connected thereto.

2. Apparatus for converting a plurality of weighted digital fluid signals to an analog fluid signal having an amplitude which is a predetermined function of the weighted sum of said digital fluid signals, said apparatus comprising:
   a plurality of groups of capillary passages, one group for each of said digital signals, all of said capillary passages having substantially the same length and cross-sectional area in order that each presents substantially the same resistance to fluid flow;
   means for applying each of said digital signals to one end of a respective group of capillary passages such that the mass flows applied to each of said capillary passages are equal, each group having a number of capillary passages which is related by said predetermined function to the weighting of the digital signal applied to said group; and
   a summing volume connected to the other end of all of said capillary passages.

3. The apparatus according to claim 2 wherein said predetermined function is proportional.

References Cited
UNITED STATES PATENTS

| | | | |
|---|---|---|---|
| 3,024,805 | 3/1962 | Horton | 137—597 |
| 3,395,719 | 8/1968 | Boothe et al. | 137—22 |
| 3,250,469 | 5/1966 | Colston | 235—200 |

OTHER REFERENCES

Shook et al., 12, Binary Counter Design, Nov. 30, 1964, HDL, Washington, D.C., pp. 1, 3, 4, 97, 98.

RICHARD B. WILKINSON, Primary Examiner

L. R. FRANKLIN, Assistant Examiner

U.S. Cl. X.R.

137—81.5